(12) United States Patent
Kubo (10) Patent No.: US 7,894,131 B2
(45) Date of Patent: Feb. 22, 2011

(54) LASER MICROSCOPE

(75) Inventor: Hirokazu Kubo, Hino (JP)

(73) Assignee: Olympus Corporation, Tokyo (JP)

( * ) Notice: Subject to any disclaimer, the term of this patent is extended or adjusted under 35 U.S.C. 154(b) by 57 days.

(21) Appl. No.: 12/012,980

(22) Filed: Feb. 6, 2008

(65) Prior Publication Data

US 2008/0192339 A1    Aug. 14, 2008

(30) Foreign Application Priority Data

Feb. 13, 2007    (JP) .............................. 2007-032247

(51) Int. Cl.
*G02B 21/06* (2006.01)
(52) U.S. Cl. .................................... 359/385
(58) Field of Classification Search ........................ None
See application file for complete search history.

(56) References Cited

U.S. PATENT DOCUMENTS

| | | | |
|---|---|---|---|
| 6,249,630 B1 * | 6/2001 | Stock et al. .................. | 385/123 |
| 6,269,206 B1 | 7/2001 | Simon et al. | |
| 6,822,978 B2 * | 11/2004 | Kafka et al. .................. | 372/18 |
| 2003/0007145 A1 | 1/2003 | Shimada | |
| 2005/0263690 A1 * | 12/2005 | Araya et al. ................. | 250/234 |
| 2006/0045163 A1 | 3/2006 | Chuang et al. | |
| 2006/0237666 A1 | 10/2006 | Kubo | |

FOREIGN PATENT DOCUMENTS

| | | |
|---|---|---|
| EP | 1 278 092 A2 | 1/2003 |
| JP | 2000-206415 A | 7/2000 |
| JP | 2006-171027 A | 6/2006 |

OTHER PUBLICATIONS

Extended European Search Report dated May 20, 2009 (6 pages), issued in counterpart European Application Serial No. 08001832.8.

* cited by examiner

*Primary Examiner*—Lee Fineman
(74) *Attorney, Agent, or Firm*—Holtz, Holtz, Goodman & Chick, PC (57) ABSTRACT

A laser microscope is provided wherein a drop in output power in a positive-dispersion element used as a pulse compressor is reduced, thus improving multiphoton-excitation efficiency. Also, a size of the positive-dispersion element is reduced, thereby making it easier to attach the pulse compressor to a microscope main body and to accommodate the pulse compressor therein, thus improving maneuverability. The invention provides a laser microscope including a laser light source for emitting ultrashort-pulsed laser light; a pulse expander for expanding the ultrashort-pulsed laser light emitted from the laser light source; a large-diameter single-mode fiber for transmitting the ultrashort-pulsed laser light expanded by the pulse expander; a pulse compressor for compressing the ultrashort-pulsed laser light transmitted by the single-mode fiber; and a microscope main body for irradiating a specimen with the ultrashort-pulsed laser light compressed by the pulse compressor.

15 Claims, 5 Drawing Sheets

LASER MICROSCOPE

BACKGROUND OF THE INVENTION

1. Field of the Invention

The present invention relates to laser microscopes.

This application is based on Japanese Patent Application No. 2007-032247, the content of which is incorporated herein by reference.

2. Description of Related Art

Laser scanning microscopes of the multiphoton excitation type are known in the related art. These microscopes irradiate a specimen with ultrashort-pulsed laser light with an average output power of several milliwatts to several hundred milliwatts and a pulse width of several tens of femtoseconds to several hundred femtoseconds, via an objective lens, and observe multiphoton fluorescence produced by a multiphoton-excitation effect induced at the focal plane of the objective lens.

In this type of laser-scanning microscope, it is preferable to introduce the laser light from the light source by using an optical fiber, which allows easy maneuverability and is highly convenient.

When ultrashort-pulsed laser light having a femtosecond-order pulse width is introduced into the optical fiber, the high optical density inside the fiber brings about a nonlinear effect (self-phase modulation: spectral broadening) which, in conjunction with the group velocity dispersion, causes the pulse width of the ultrashort-pulsed laser light emitted from the end of the objective lens to increase, resulting in the problem of impaired multiphoton-excitation efficiency.

One known way to solve this problem is to use a laser microscope in which a negative-dispersion optical system is disposed between the optical fiber and the laser light source emitting the ultrashort-pulsed laser light, and a positive-dispersion element is disposed between the optical fiber and the microscope main body (for example, see Japanese Unexamined Patent Application, Publication No. 2000-206415 and U.S. Pat. No. 6,269,206).

With this laser microscope, because the ultrashort-pulsed laser light is introduced into the optical fiber with its pulse width widened in advance by the negative-dispersion optical system, it is possible to avoid the generation of the nonlinear effect in the optical fiber.

Then, because recompression of the pulse width of the ultrashort-pulsed laser light is performed near the exit end of the optical fiber, to avoid generation of the nonlinear effect associated therewith, positive dispersion is applied by the positive-dispersion element disposed at the downstream side of the optical fiber to make the pulse width after exiting the positive-dispersion element substantially the same as that before being incident on the negative-dispersion optical system.

In the laser microscopes disclosed in Japanese Unexamined Patent Application, Publication No. 2000-206415 and U.S. Pat. No. 6,269,206, to prevent the pulse width of the ultrashort-pulsed laser light from expanding while propagating through the optical fiber, it is not possible to use a multi-mode fiber; instead, it is necessary to use a single-mode fiber. The core diameter of a single-mode fiber is generally about several micrometers. In order to suppress the generation of a nonlinear effect in the fiber, it is necessary to substantially increase the amount of negative dispersion to reduce the incident peak intensity at the fiber, and it is necessary to substantially increase the amount of positive dispersion of the positive-dispersion element located at the downstream side of the fiber.

However, when the amount of positive dispersion to be applied is too large, the thickness of the positive-dispersion element increases, and a drop in the output power due to internal absorption in the positive-dispersion element becomes more pronounced, which causes a reduction in the efficiency of the multiphoton-excitation effect in the specimen.

Moreover, when the amount of positive dispersion to be applied is too large, the size of the positive-dispersion element becomes large, thus making it difficult to attach it to the microscope main body and to accommodate it therein. When the microscope main body increases in size, the advantage of being able to improve the maneuverability of the microscope main body by using the optical fiber vanishes.

BRIEF SUMMARY OF THE INVENTION

An aspect of the present invention is a laser microscope including a laser light source configured to emit ultrashort-pulsed laser light; a pulse expander configured to expand the ultrashort-pulsed laser light emitted from the laser light source; a large-diameter single-mode fiber configured to transmit the ultrashort-pulsed laser light expanded by the pulse expander; a pulse compressor configured to compress the ultrashort-pulsed laser light transmitted by the single-mode fiber; and a microscope main body configured to irradiate a specimen with the ultrashort-pulsed laser light compressed by the pulse compressor.

By employing the large-diameter single-mode fiber, it is possible to increase the peak intensity of the ultrashort-pulsed laser light entering the single-mode fiber without increasing nonlinear effects occurring in the single-mode fiber. As a result, it is possible to reduce the pulse width of the incident ultrashort-pulsed laser light and to reduce the amount of compensation applied by the pulse expander and the pulse compressor.

In other words, it is possible to reduce the size of the pulse compressor, thus reducing the amount of light loss and improving the multiphoton excitation efficiency in the specimen. In addition, reducing the size of the pulse compressor makes it easier to attach it to a microscope main body and to accommodate it therein, and it is possible to reduce the size of the overall apparatus, which improves the maneuverability.

In the aspect described above, the single-mode fiber may be a photonic-crystal fiber; and the laser light source may emit near-infrared ultrashort-pulsed laser light and has a wavelength-tunable function.

By doing so, it is possible to transmit the ultrashort-pulsed laser light in a single mode over a wide wavelength band. Therefore, it is possible to observe the multiphoton fluorescence while varying the wavelength of the ultrashort-pulsed laser light.

In the aspect described above, the single-mode fiber may have a core diameter equal to or greater than a minimum effective core diameter set according to the following equations:

$$D_{min} = 2 \times \sqrt{(A_{eff}/\pi)} \quad (1)$$

$$A_{eff} = 2\pi/\lambda \times n_2 \times P_{o\_max} \times L/a \quad (2)$$

$$P_{o\_max} = 2 \times \sqrt{(ln2/\pi)} \times P_{ave}/(\Delta t_{in} \times \nu) \quad (3)$$

$$\Delta t_{in} \approx \Delta t_{out} \times \sqrt{\{1 + 7.68 \times [(GDD_f + GDD_c)/(\Delta t_{out}^2)]^2\}} \quad (4)$$

where $D_{min}$ is the minimum effective core diameter of the single-mode fiber; $A_{eff}$ is an effective cross-sectional core area; $\lambda$ is wavelength; $n_2$ is a nonlinear refractive index of the single-mode fiber; a is a constant; L is the length of the single-mode fiber; $P_{o\_max}$ is a maximum incident peak intensity on the fiber for which it is possible to transmit a pulse of $\Delta t_{out}$ or less; $P_{ave}$ is an average output power at an exit end of the fiber; ν is a repetition frequency; $\Delta t_{in}$ is an incident pulse width at the fiber; $\Delta t_{out}$ is an exit pulse width of an objective lens in the microscope main body; $GDD_f$ is a group delay dispersion of the fiber; and $GDD_c$ is a group delay dispersion of the pulse compressor and the microscope main body.

By doing so, it is possible to irradiate the specimen with ultrashort-pulsed laser light having the target pulse width, which can prevent a drop in the multiphoton excitation efficiency.

In the aspect described above, a plurality of the single-mode fibers may be provided in parallel.

By doing so, it is possible to reduce the incident peak intensity of the ultrashort-pulsed laser light per single-mode fiber, and it is thus possible to suppress the generation of nonlinear effects in the single-mode fibers.

In the aspect described above, the pulse expander may be formed of an optical system producing negative dispersion, including, for example, a pair of gratings.

By doing so, it is possible to easily adjust the amount of negative dispersion and to suppress the generation of nonlinear effects in the single-mode fiber.

In the configuration described above, the microscope main body may include an objective lens facing the specimen; and the pulse expander may adjust the amount of negative dispersion according to the type of the objective lens and/or the wavelength of the ultrashort-pulsed laser light, in order to minimize a pulse width after exiting the objective lens.

With this configuration, it is possible to suppress the generation of nonlinear effects in the single-mode fiber, even when the type of objective lens or the wavelength of the ultrashort-pulsed laser light is changed.

In the aspect described above, the microscope main body may include a light detector configured to detect fluorescence generated in the specimen; and the pulse expander may adjust the amount of negative dispersion according to a fluorescence intensity detected by the light detector.

With this configuration, it is possible to adjust the amount of negative dispersion so that the target fluorescence intensity is obtained, which allows a clear multiphoton-fluorescence image to be acquired.

The configuration described above may further include an average-output-power adjusting optical system, between the laser light source and the single-mode fiber, configured to adjust an average output power of the laser light source, wherein the pulse expander adjusts the amount of negative dispersion according to the type of the objective lens and/or the wavelength of the ultrashort-pulsed laser light and/or the average output power in order to minimize a pulse width after exiting the objective lens.

With this configuration, it is possible to adjust the average output power of the laser light source by operating the average-output-power adjusting optical system, and it is thus possible to irradiate the specimen with the ultrashort-pulsed laser light without causing damage to the specimen.

In the aspect described above, the single-mode fiber laser may be an unpolarized single-mode fiber; and the pulse compressor may be formed of an isotropic, high-refractive-index, positive-dispersion material such as ZnSe crystal.

By doing so, it is possible to construct the system at low cost with parts that are comparatively readily available. Also, it is possible to reduce shifting of the optical axis before and after passing through the pulse compressor.

In the aspect described above, the single-mode fiber may be a polarization-maintaining single-mode fiber; and the pulse compressor may be formed of an optical system producing positive dispersion, including an isotropic, high-refractive-index, positive-dispersion material such as ZnSe crystal, an anisotropic, high-refractive-index positive-dispersion material such as an acousto-optic device or an electro-optic device, or a pair of gratings.

With this configuration, multiple types of pulse compressor are available, and it is possible to use an optical system whose laser light characteristics, for instance, can be adjusted.

In the aspect described above, the pulse compressor may adjust the amount of positive dispersion according to the type of the objective lens and/or the wavelength of the ultrashort-pulsed laser light so as to minimize a pulse width after exiting the objective lens.

By doing so, it is possible to suppress the generation of nonlinear effects in the single-mode fiber, even when the kind of objective lens or the wavelength of the ultrashort-pulsed laser light is changed.

In the configuration described above, the microscope main body may include a light detector configured to detect fluorescence generated in the specimen; and the pulse compressor may adjust the amount of positive dispersion according to a fluorescence intensity detected by the light detector.

By doing so, it is possible to adjust the amount of positive dispersion so as to obtain the target fluorescence intensity, which allows a clear multiphoton-fluorescence image to be acquired.

The aspect described above may further include an average-output-power adjusting optical system, between the laser light source and the single-mode fiber, for adjusting an average output power of the laser light source, wherein the pulse compressor adjusts the amount of positive dispersion according to the type of the objective lens and/or the wavelength of the ultrashort-pulsed laser light and/or the average output power in order to minimize a pulse width after exiting the objective lens.

With this configuration, it is possible to adjust the average output power of the laser light source by operating the average-output-power adjusting optical system, which allows the specimen to be irradiated with the ultrashort-pulsed laser light without causing damage to the specimen.

According to the present invention, it is possible to reduce the drop in output power in a positive-dispersion element used as a pulse compressor, and the multiphoton-excitation efficiency can thus be improved. In addition, with the present invention, reducing the size of the positive-dispersion element makes it easier to attach it to the microscope main body and to accommodate it therein, thus improving maneuverability.

DETAILED DESCRIPTION OF THE INVENTION

A laser microscope 1 according to an embodiment of the present invention is described below with reference to FIGS. 1 and 2.

Figure 1:
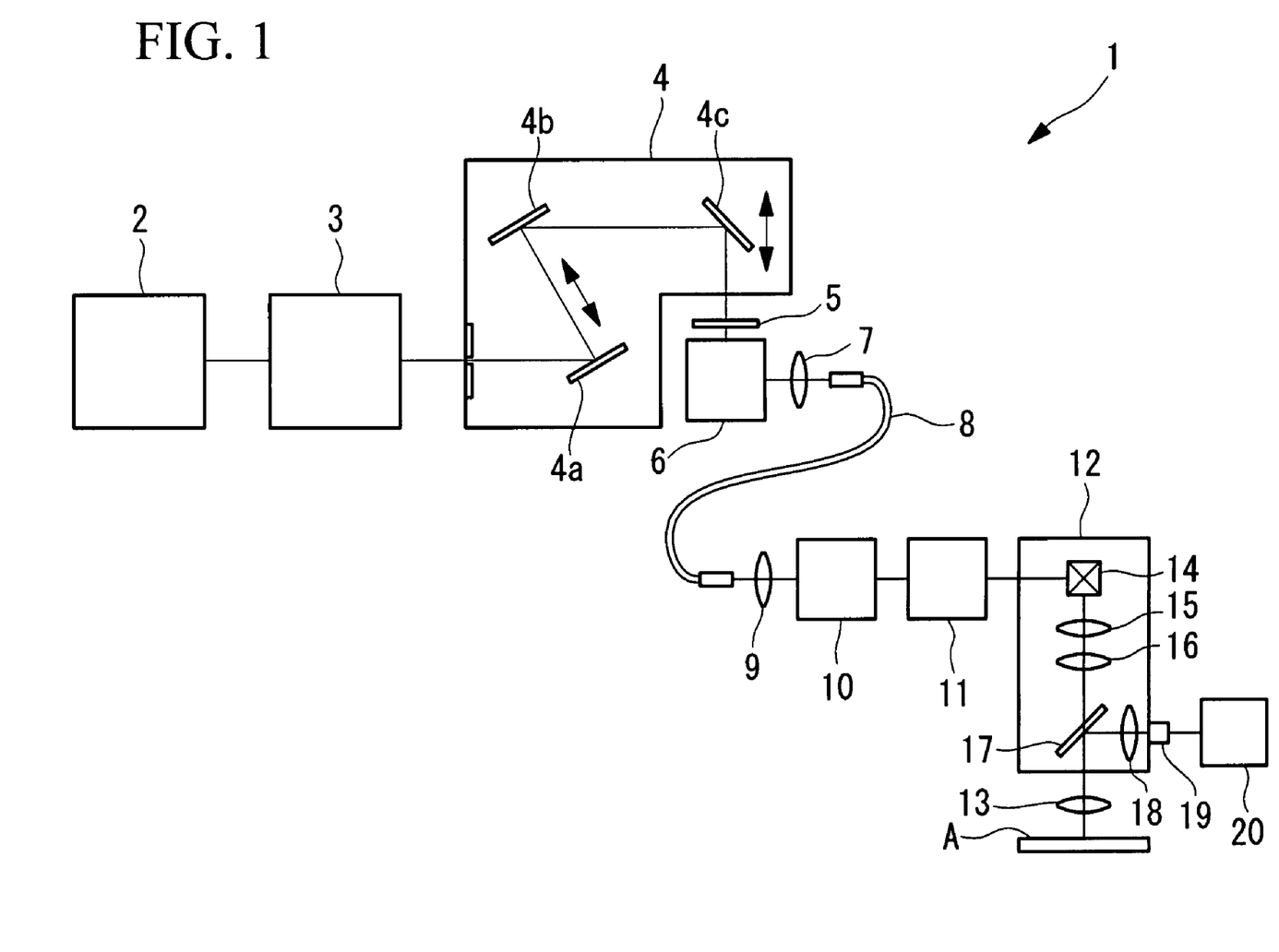
FIG. 1 is a block diagram showing the overall configuration of a laser microscope according to an embodiment of the present invention.
Figure 2:
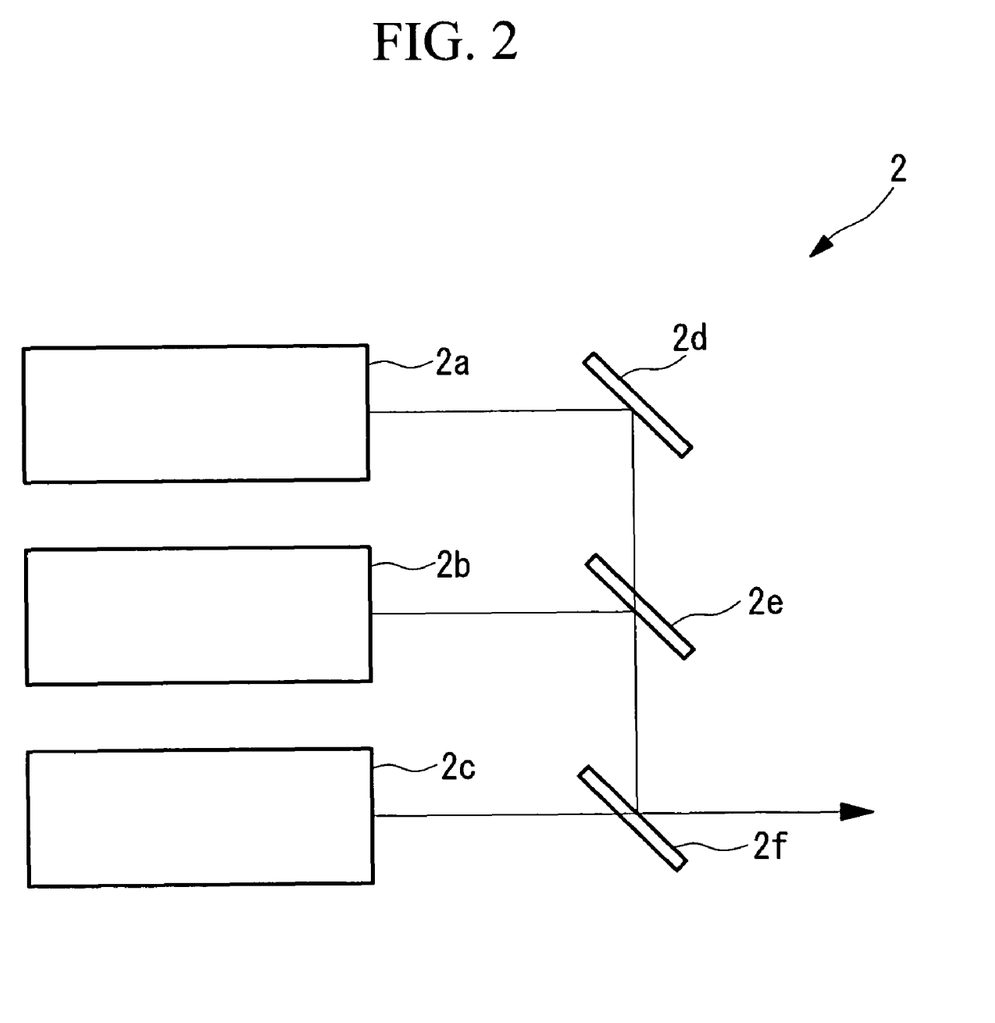
FIG. 2 is a diagram showing a modification of a laser light source in the laser microscope in FIG. 1.

As shown in FIG. 1, the laser microscope 1 according to this embodiment is a multiphoton-excitation-type laser microscope in which a multiphoton-excitation effect is induced in a specimen A. The laser microscope 1 includes a laser light source 2 for emitting ultrashort-pulsed laser light, an average-output-power adjusting optical system 3, a pulse expander 4, a quarter-wave plate 5, an alignment-adjusting optical system 6, a coupling optical system 7, a large-diameter singe-mode fiber 8, a collimator optical system 9, a beam-shaping optical system 10, a pulse compressor 11, and a microscope main body 12, in this order from the laser light source 2 side.

The laser light source 2 emits ultrashort-pulsed laser light with a tunable wavelength, for example, in the wavelength range of 700 to 1000 nm.

The average-output-power adjusting optical system 3 is formed, for example, of an acousto-optic device, an electro-optic device, an ND filter, or a combination of a half-wave plate and a polarizer. It is configured to adjust the average output power of the ultrashort-pulsed laser light emitted from the laser light source 2 so that a target fluorescence intensity is obtained.

As shown in FIG. 1, for example, the pulse expander 4 is formed of an opposing pair of gratings 4a and 4b, a mirror 4c, and a device for driving them (not shown in the drawing). The gap between the pair of gratings 4a and 4b or the position of the mirror 4c is adjusted in the direction of the arrow to adjust the amount of negative dispersion to be applied to the ultrashort-pulsed laser light, according to the wavelength of the ultrashort-pulsed laser light emitted from the laser light source 2, the type of the objective lens 13 provided in the microscope main body 12, or the average output power of the ultrashort-pulsed laser light, so that the ultrashort-pulsed laser light emitted from the end of the objective lens 13 has a prescribed pulse width.

The quarter-wave plate 5, in combination with the gratings 4a and 4b in the pulse expander 4, prevents the ultrashort-pulsed laser light reflected at an end face of the single-mode fiber 8 from returning to the laser light source 2.

The alignment-adjusting optical system 6 compensates for shifting and tilting of the optical axis caused by movement of the pair of gratings 4a and 4b and the mirror 4c in the pulse expander 4.

By moving at least one lens in the optical axis-direction, the coupling optical system 7 can adjust the focal position of the ultrashort-pulsed laser light so that it does not shift in the optical-axis direction towards the end face of the single-mode fiber 8 as the optical path length changes due to motion of the pair of gratings 4a and 4b and the mirror 4c in the pulse expander 4.

The single-mode fiber 8 is a near-infrared photonic-crystal fiber whose core diameter is set to a size calculated from the following expressions, or greater:

$$D_{min} = 2 \times \sqrt{(A_{eff}/\pi)} \quad (1)$$

$$A_{eff} = 2\pi/\lambda \times n_2 \times P_{o\_max} \times L/a \quad (2)$$

$$P_{o\_max} = 2 \times \sqrt{(ln2/\pi)} \times P_{ave}/(\Delta t_{in} \times v) \quad (3)$$

$$\Delta t_{in} \approx \Delta t_{out} \times \sqrt{\{1 + 7.68 \times [(GDD_f + GDD_c)/(\Delta t_{out}^2)]^2\}} \quad (4)$$

Here, $D_{min}$: minimum effective core diameter of the single-mode fiber 8;

$A_{eff}$: effective cross-sectional area of core;

$\lambda$: wavelength;

$n_2$: nonlinear refractive index of the single-mode fiber 8;

a: constant;

L: length of the single-mode fiber 8;

$P_{o\_max}$: maximum incident peak intensity at fiber for which it is possible to transmit a pulse of $\Delta t_{out}$ or less;

$P_{ave}$: average output power at exit end of the single-mode fiber 8;

$v$: repetition frequency;

$\Delta t_{in}$: incident pulse width at the single-mode fiber 8;

$\Delta t_{out}$: exit pulse width of the objective lens 13;

$GDD_f$: group delay dispersion of the single-mode fiber 8;

$GDD_c$: group delay dispersion of the pulse compressor 11 and the microscope main body 12.

The exit pulse width $\Delta t_{out}$ at the objective lens 13 is set according to the intended use of the ultrashort-pulsed laser light. For example, in this embodiment, it is set to range from about 1 to 3 times the pulse width of the laser light source 2. The constant a is determined by experimentally setting $P_{o\_max}$ on the basis of the set value of the exit pulse width $\Delta t_{out}$. More specifically, as the peak intensity $P_o$ of the ultrashort-pulsed laser light entering the fiber increases, nonlinear effects in the fiber become more pronounced, expanding the pulse width $\Delta t_{out}$. Therefore, an experimental system is constructed for introducing the ultrashort-pulsed laser light into the fiber, and the value of $\Delta t_{out}$ when the incident peak intensity $P_o$ at the fiber is changed is measured in advance. When the target value of $\Delta t_{out}$ is determined, the incident peak intensity $P_{o\_max}$ corresponding to the set $\Delta t_{out}$ can be obtained on the basis of a plot of the experimentally measured $P_o$ and $\Delta t_{out}$.

It is possible to obtain the constant a using the following expression, from the value of the incident peak intensity $P_{o\_max}$ obtained in this way:

$$\gamma = (2\pi/\lambda) \cdot (n_2/A_{eff}) \quad (5)$$

$$L_{n1} = 1/(\gamma \cdot P_{o\_max}) \quad (6)$$

$$a = L/L_{n1} = L \cdot \gamma \cdot P_{o\_max} \quad (7)$$

where $\gamma$: nonlinear constant; and $L_{n1}$: nonlinear length.

It is possible to determine the nonlinear constant $\gamma$ from eq. (5) and the length L of the single-mode fiber 8 on the basis of the specifications of the optical fiber used in the experimental system described above. From these values and the value of $P_{o\_max}$ determined with the experimental system described above, it is possible to determine the constant a using eqs. (6) and (7).

Because the constant a is a condition for $\Delta t_{out}$ to become the set value described above, $\Delta t_{out}$ is kept at the set value so long as eqs. (5) to (7) hold with respect to the obtained value of the constant a. Therefore, it is possible to freely vary L, $\gamma$, and $P_{o\_max}$ within ranges for which these relational expressions hold, and $P_{o\_max}$ can be increased by increasing, for example, $A_{eff}$.

As a condition for making the nonlinear effects in the single-mode fiber 8 negligible, it is necessary to reduce the maximum incident peak intensity $P_{o\_max}$ on the fiber, in eqs.

(2) and (7). However, when the maximum incident peak intensity $P_{o\_max}$ on the fiber is reduced, from eq. (3), it is necessary to reduce the average output power $P_{ave}$ at the exit end of the single-mode fiber 8, or to increase the incident pulse width $\Delta t_{in}$ at the single-mode fiber 8. In either case, however, the output power that can be transmitted drops. The following describes how the constant a is set to obtain the target pulse width. Regarding the setting of the constant a, nonlinear phenomena are induced when a≈1, the nonlinear phenomena become more pronounced when a >1, and the nonlinear phenomena are negligible when a <<1. As above, when the constant a increases, $P_{o\_max}$ also increases; therefore, it is possible to increase the transmitted output power by setting a to be larger than 1, within a range which allows the nonlinear effect to be generated in the single-mode fiber 8, to obtain the target pulse width. In other words, it is possible to improve the transmitted output power by allowing some degree of generation of the nonlinear effect in the single-mode fiber 8.

By moving at least one lens in the optical-axis direction, the collimator optical system 9 converts the ultrashort-pulsed laser light emitted from the exit end of the single-mode fiber 8 to substantially collimated light.

The beam-shaping optical system 10 is formed of at least two lenses. By moving at least one of the lenses in the optical-axis direction, the ultrashort-pulsed laser light is shaped so that the beam diameter thereof fills the pupil of the objective lens 13.

The pulse compressor 11 restores the pulse width of the ultrashort-pulsed laser light after exiting the objective lens 13 to the same value as that when it entered the pulse expander 4 by applying a prescribed amount of positive dispersion to the ultrashort-pulsed laser light passing through the single-mode fiber 8.

More specifically, if the single-mode fiber 8 is a randomly polarized fiber, the pulse compressor 11 uses an isotropic, high-refractive-index, positive-dispersion material, and if it is a polarization-maintaining fiber, it is formed of an anisotropic, high-refractive-index, positive-dispersion material, as represented by an acousto-optic device or an electro-optic device, or a pair of gratings, etc.

The microscope main body 12 includes a scanner 14 for two-dimensionally scanning the ultrashort-pulsed laser light having a pulse width which is restored to a certain degree by the pulse compressor 11; a pupil projection lens 15; an image-forming lens 16; the objective lens 13 for focusing the ultrashort-pulsed laser light converted to substantially collimated light by the image-forming lens 16 to irradiate the specimen A and for collecting multiphoton fluorescence generated in the specimen A; a dichroic mirror 17 for splitting off the multiphoton fluorescence collected by the objective lens 13 from the light path of the ultrashort-pulsed laser light; a focusing lens 18 for focusing the multiphoton fluorescence split off by the dichroic mirror 17; a light detector 19 for detecting the focused multiphoton fluorescence; and a display unit 20 for constructing and displaying a multiphoton-fluorescence image on the basis of the multiphoton fluorescence detected by the light detector 19.

The operation of the laser microscope 1 according to this embodiment, having such a configuration, will be described below.

With the laser microscope 1 according to this embodiment, the average output power of the ultrashort-pulsed laser light is adjusted by passing the ultrashort-pulsed laser light emitted from the laser light source 2 through the average-output-power adjusting optical system 3. Even if there is no average-output-power adjusting optical system 3, it is possible to vary the peak intensity of the ultrashort-pulsed laser light emitted from the objective lens 13, and it is thus possible to obtain the target fluorescence intensity by adjusting the amount of dispersion of the pulse expander 4 or the pulse compressor 11. In such a case, however, the average output power does not change; therefore, this approach is undesirable because there is a risk of damaging (burning) the specimen A. According to this embodiment, it is possible to obtain the target fluorescence intensity by adjusting the average output power of the ultrashort-pulsed laser light, and it is thus possible to perform fluoroscopy while maintaining the integrity of the specimen A.

By passing the ultrashort-pulsed laser light, whose average output power has been adjusted through the pulse expander 4, a certain amount of negative dispersion is applied thereto, which expands the pulse width. Then, any shifting of the optical axis is corrected by the alignment-adjusting optical system 6, the focal position is adjusted by the coupling optical system 7, and the light is incident on the end face of the single-mode fiber 8.

In this embodiment, because the single-mode fiber 8 has a core diameter equal to or greater than the minimum effective core diameter given by eq. (1), it is possible to make the peak intensity of the ultrashort-pulsed laser light entering the single-mode fiber 8 comparatively large. Thus, by increasing the peak intensity, it is possible to shorten the pulse width, as shown in eq. (3), and it is possible to reduce the amount of dispersion applied by the pulse expander 4 and the pulse compressor 11.

In other words, as well as being able to reduce the size of the pulse compressor 11, it is also possible to reduce light loss in the pulse compressor 11, which makes it possible to improve the multiphoton-excitation efficiency in the specimen A, at the focal plane of the objective lens 13. In addition, it is also possible to improve the transmission efficiency of the ultrashort-pulsed laser light through the single-mode fiber 8. Furthermore, by reducing the size of the pulse compressor 11, it becomes easier to install it in the microscope main body 12, which avoids an increase in size of the microscope main body 12. As a result, an advantage is realized by transmission through the single-mode fiber 8; namely, the maneuverability is improved.

In this embodiment, because a near-infrared photonic crystal fiber is used as the single-mode fiber 8, it is possible to transmit light in a single mode over a wide wavelength range, and it is possible to easily perform wavelength-scanning observation.

With standard commercially available single-mode fibers or polarization-maintaining single-mode fibers, it is not possible to maintain single-mode transmission over the wavelength range (700 to 1000 nm) of a femtosecond mode-locked Ti:sapphire laser used as the laser light source 2. Therefore, when performing fluoroscope using multiphoton excitation, sometimes it is necessary to also change the type of single-mode fiber according to the optimum excitation wavelength of the fluorescent dye used, resulting in the drawback that the structure of the apparatus becomes more complex.

In this case, although a polarization-maintaining photonic-crystal fiber can be used as the single-mode fiber 8, because the core diameter thereof is comparatively small, it is preferable to use a randomly polarized photonic-crystal fiber having a comparatively large core diameter. Accordingly, in the pulse compressor 11, it is desirable to use an isotropic material with high positive dispersion, having no refractive index dependency on the crystal axis (ZnSe or the like).

In this embodiment, the laser light source 2, whose wavelength can be continuously varied in the near-infrared region, is illustrated as an example. Instead of this, however, as shown in FIG. 2, it is possible to combine ultrashort-pulsed laser light from a plurality of laser light sources 2a to 2c with different single wavelengths onto the same optical path by using combining mirrors 2d to 2f.

Although the illustrated pulse expander 4 has the pair of gratings 4a and 4b, it is possible to employ a device having a pair of prisms instead.

The ultrashort-pulsed laser light reflected at the end face of the single-mode fiber 8 is prevented from returning to the laser light source 2 by providing the quarter-wave plate 5. Instead of this, however, it is possible to use an isolator, to grind the end face of the single-mode fiber 8 at an angle, or to provide an antireflection coating on the end face of the single-mode fiber 8.

Figure 3A:
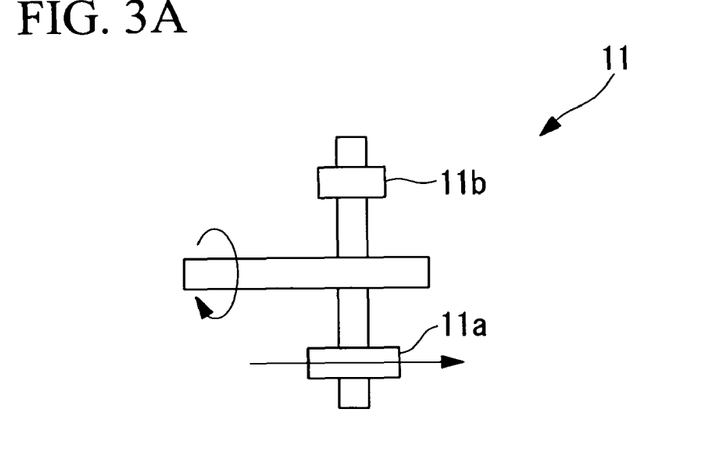
FIG. 3A is a diagram showing an example of a pulse compressor in the laser microscope in FIG. 1.
Figure 3B:
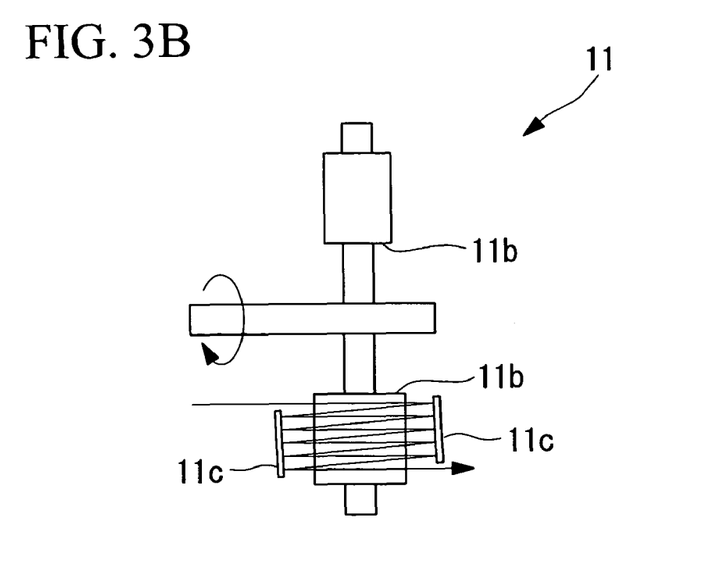
FIG. 3B is a diagram showing an example of the pulse compressor in the laser microscope in FIG. 1.
Figure 3C:
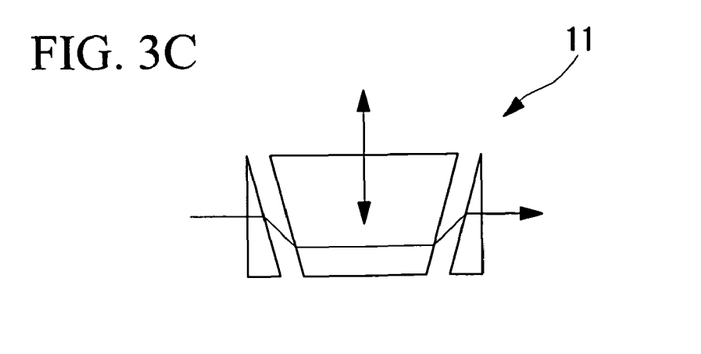
FIG. 3C is a diagram showing an example of the pulse compressor in the laser microscope in FIG. 1.

In conjunction with the pulse expander 4, it is also possible to vary the crystal length in the pulse compressor 11 according to the wavelength of the ultrashort-pulsed laser light, the type of objective lens 13, and the incident average output power, so that the ultrashort-pulsed laser light emitted from the objective lens 13 has a prescribed pulse width. The variable value should be stored in advance to match that of the pulse expander 4. Also, it is possible to finely adjust the amount of dispersion or crystal length of the pulse compressor 11 so that the acquired fluorescence intensity is maximized. One example of a way of adjusting the crystal length is to switch between ZnSe crystals (high-refractive-index positive-dispersion material) 11a and 11b having different crystal lengths with a revolver, as shown in FIGS. 3A to 3C. FIG. 3A shows a single-pass type, and FIG. 3B shows a multi-pass type. Reference numeral 11c in the drawings is a mirror. As shown in FIG. 3C, it is also possible to use prisms.

Figure 4:
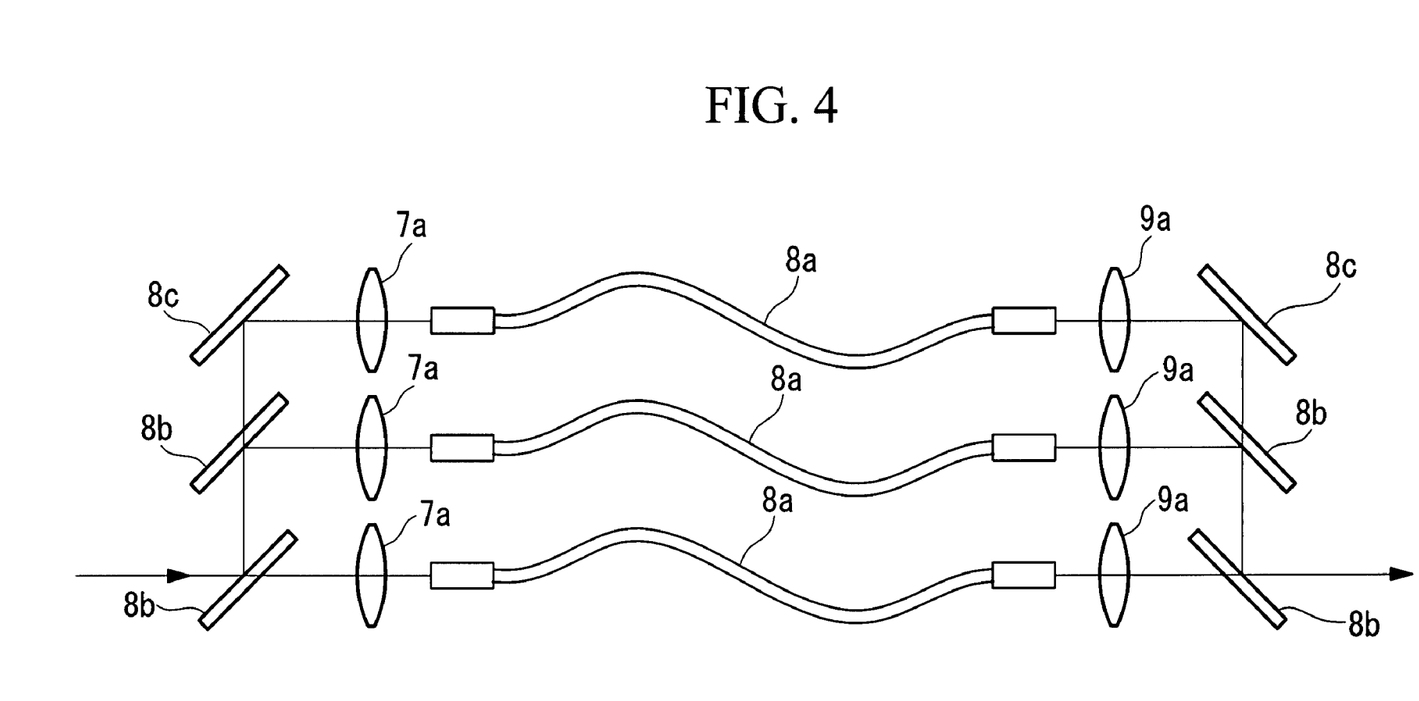
FIG. 4 is a diagram showing a modification of the single-mode fiber in the laser microscope in FIG. 1.

In this embodiment, the ultrashort-pulsed laser light is transmitted using one single-mode fiber 8. Instead of this, however, as shown in FIG. 4, it is possible to split the ultrashort-pulsed laser light emitted from the alignment-adjusting optical system 6 into a plurality of light paths and transmit them through single-mode fibers 8a disposed in the respective light paths, and then combine them into the same light path. Reference numerals 8b in the drawing are dichroic mirrors, reference numerals 8c are mirrors, reference numerals 7a are coupling optical systems, and reference numerals 9a are collimator optical systems.

Figure 5:
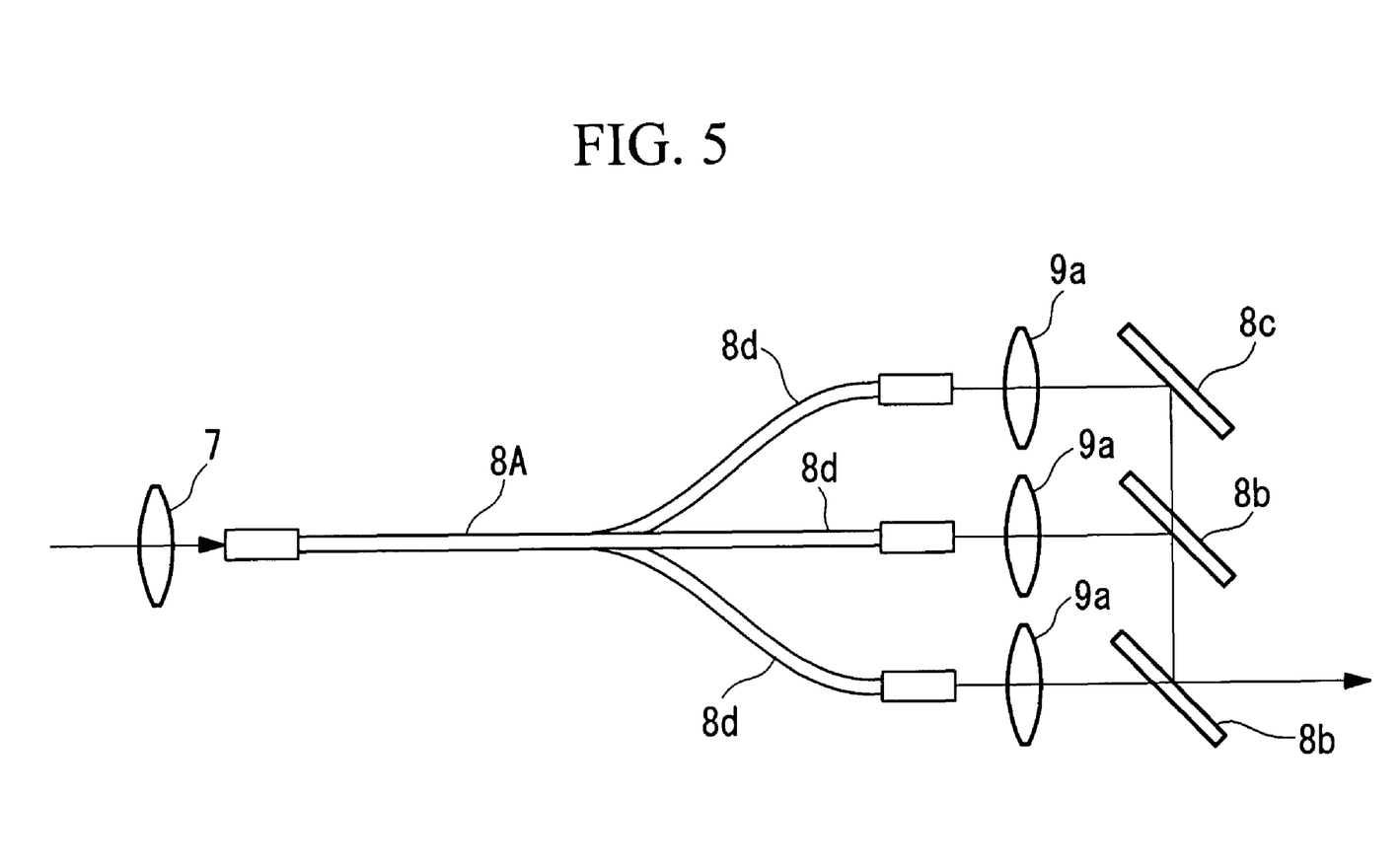
FIG. 5 is a diagram showing another modification of the single-mode fiber in the laser microscope in FIG. 1.

As shown in FIG. 5, it is also possible to separate a fiber bundle 8A and then combine the ultrashort-pulsed laser light emitted from a plurality of cores 8d into the same optical path.

By doing so, it is possible to reduce the incident peak intensity of the ultrashort-pulsed laser light per single-mode fiber 8, thus making it possible to suppress nonlinear effects in the single-mode fiber 8. Therefore, an advantage is afforded in that it is possible to make the pulse expander 4 and the pulse compressor 11 even smaller.

What is claimed is:

1. A laser microscope comprising:
    a laser light source configured to emit ultrashort-pulsed laser light;
    an objective lens adapted to face a specimen;
    a pulse expander which comprises an optical system producing negative dispersion, and which is configured to expand the ultrashort-pulsed laser light emitted from the laser light source and adjust an amount of negative dispersion in order to minimize a pulse width of the ultrashort-pulsed laser light exiting the objective lens;
    a large-diameter single-mode fiber configured to transmit the ultrashort-pulsed laser light expanded by the pulse expander;
    a pulse compressor which comprises one of: (i) an isotropic, high-refractive-index, positive-dispersion material, and (ii) an anisotropic, high-refractive-index, positive-dispersion material, and which is configured to compress the ultrashort-pulsed laser light transmitted by the single-mode fiber; and
    a microscope main body configured to irradiate the specimen with the ultrashort-pulsed laser light compressed by passing through the pulse compressor;
    wherein the single-mode fiber has a core diameter that is at least equal to a minimum effective core diameter set according to the following equations:

$$D_{min}=2\times\sqrt{(A_{eff}/\pi)} \quad (1)$$

$$A_{eff}=2\pi/\lambda \times n_2 \times P_{o\_max} \times L/a \quad (2)$$

$$P_{o\_max}2\times\sqrt{(ln2/\pi)}\times P_{ave}/(\Delta t_{in}\times v) \quad (3)$$

$$\Delta t_{in} \approx \Delta t_{out} \times \sqrt{\{1+7.68\times[(GDD_f+GDD_c)/(\Delta t_{out}^2)]^2\}} \quad (4)$$

where
$D_{min}$ is the minimum effective core diameter of the single-mode fiber;
$A_{eff}$ is an effective cross-sectional core area;
$\lambda$ is a wavelength;
$n_2$ is a nonlinear refractive index of the single-mode fiber;
a is a constant;
L is a length of the single-mode fiber;
$P_{o\_max}$ is a maximum incident peak intensity on the fiber for which it is possible to transmit a pulse of $\Delta t_{out}$ or less;
$P_{ave}$ is an average output power at an exit end of the fiber;
$v$ is a repetition frequency;
$\Delta t_{in}$ is an incident pulse width at the fiber;
$\Delta t_{out}$ is an exit pulse width of the objective lens;
$GDD_f$ is a group delay dispersion of the fiber;
$GDD_c$ is a group delay dispersion of the pulse compressor and the microscope main body;
$\Delta t_{out}$ is set to range from about 1 to 3 times a pulse width of the laser light source;
$P_{o\_max}$ corresponding to the set $\Delta t_{out}$ is determined by an experimental system constructed for introducing the ultrashort-pulsed laser light into the fiber; and
a is determined by the following equations:

$$\gamma=(2\pi/\lambda)\cdot(n_2/A_{eff}) \quad (5)$$

$$L_{n1}=1/(\gamma \cdot P_{o\_max}) \quad (6)$$

$$a=L/L_{n1}=L\cdot\gamma P_{o\_max} \quad (7)$$

where
$\gamma$ is a nonlinear constant; and
$L_{n1}$ is a nonlinear length.

2. The laser microscope according to claim 1, wherein:
    the single-mode fiber is a photonic-crystal fiber; and
    the laser light source emits near-infrared ultrashort-pulsed laser light and has a wavelength-tunable function.

3. The laser microscope according to claim 1, wherein a plurality of the single-mode fibers are provided in parallel.

4. The laser microscope according to claim 1, wherein the pulse expander adjusts the amount of negative dispersion according to at least one of a type of the objective lens and a wavelength of the ultrashort-pulsed laser light.

5. The laser microscope according to claim 4 wherein:
    the microscope main body includes a light detector configured to detect fluorescence generated in the specimen; and the pulse expander adjusts the amount of negative dispersion according to a fluorescence intensity detected by the light detector.

6. The laser microscope according to claim 1, further comprising:

an average-output-power adjusting optical system which is provided between the laser light source and the single-mode fiber, and which is configured to adjust an average output power of the laser light source, wherein the pulse expander adjusts the amount of negative dispersion according to at least one of a type of the objective lens, a wavelength of the ultrashort-pulsed laser light and the average output power.

7. The laser microscope according to claim 1, wherein the single-mode fiber is an unpolarized single-mode fiber, and the pulse compressor comprises ZnSe crystal.

8. The laser microscope according to claim 7, wherein the pulse compressor adjusts an amount of positive dispersion according to at least one of a type of the objective lens and a wavelength of the ultrashort-pulsed laser light so as to minimize the pulse width of the ultrashort-pulsed laser light exiting the objective lens.

9. The laser microscope according to claim 8, wherein:

the microscope main body includes a light detector configured to detect fluorescence generated in the specimen; and the pulse compressor adjusts the amount of positive dispersion according to a fluorescence intensity detected by the light detector.

10. The laser microscope according to claim 7, further comprising:

an average-output-power adjusting optical system which is provided between the laser light source and the single-mode fiber, and which is configured to adjust an average output power of the laser light source, wherein the pulse compressor adjusts an amount of positive dispersion according to at least one of a type of the objective lens, a wavelength of the ultrashort-pulsed laser light, and the average output power, in order to minimize the pulse width of the ultrashort-pulsed laser light exiting the objective lens.

11. The laser microscope according to claim 1, wherein:

the single-mode fiber is a polarization-maintaining single-mode fiber; and the pulse compressor comprises an optical system producing positive dispersion.

12. The laser microscope according to claim 11, wherein the pulse compressor adjusts an amount of positive dispersion according to a wavelength of the ultrashort-pulsed laser light so as to minimize the pulse width of the ultrashort-pulsed laser light exiting the objective lens.

13. The laser microscope according to claim 11, wherein the pulse compressor comprises ZnSe crystal.

14. The laser microscope according to claim 1, wherein the pulse expander adjusts the amount of negative dispersion according to a wavelength of the ultrashort-pulsed laser light.

15. The laser microscope according to claim 1, wherein the pulse compressor comprises ZnSe crystal.

* * * * *